(No Model.)
M. THUM.
SAFETY DEVICE FOR ELECTRIC CIRCUITS.
No. 479,035. Patented July 19, 1892.
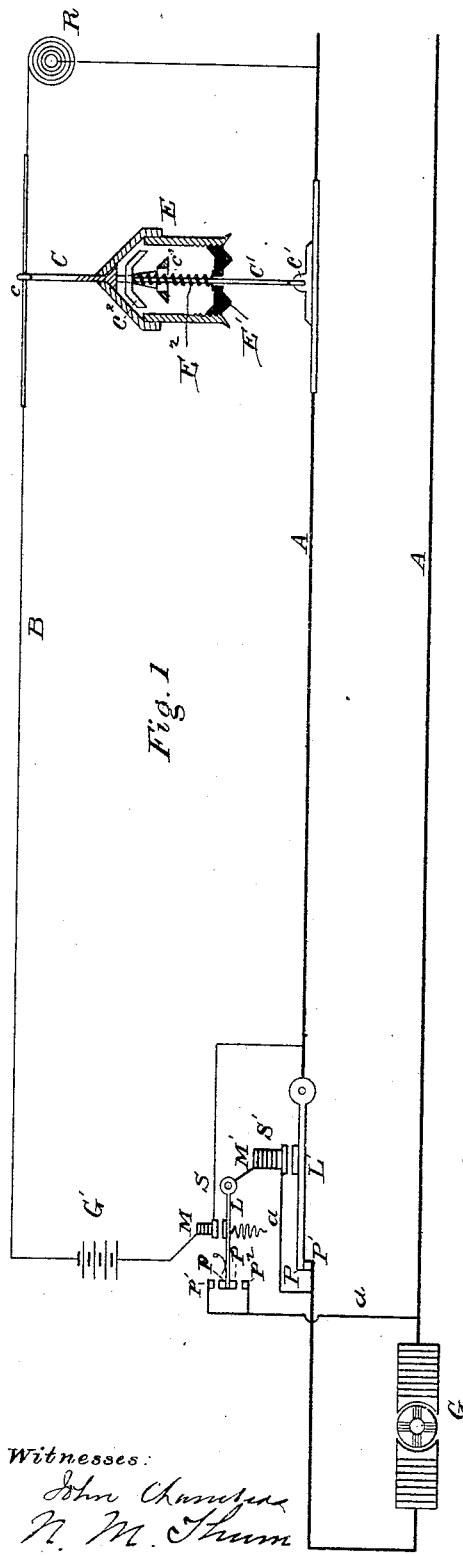
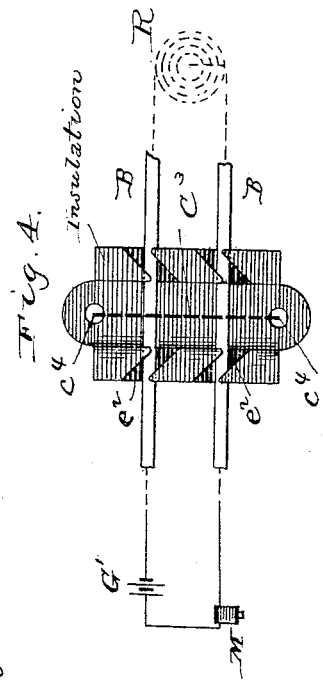
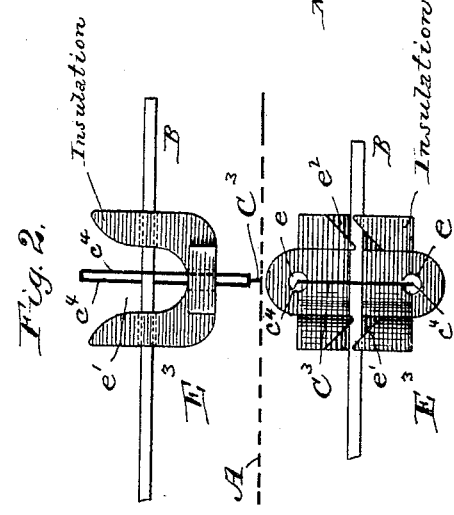
Witnesses:
Inventor:
Mandeville Thum
by H. N. Low
attorney.

UNITED STATES PATENT OFFICE.

MANDEVILLE THUM, OF LOUISVILLE, KENTUCKY.

SAFETY DEVICE FOR ELECTRIC CIRCUITS.

SPECIFICATION forming part of Letters Patent No. 479,035, dated July 19, 1892.

Application filed June 5, 1891. Serial No. 395,268. (No model.)

*To all whom it may concern:*

Be it known that I, MANDEVILLE THUM, a citizen of the United States, residing at Louisville, in the county of Jefferson and State of Kentucky, have invented certain new and useful Improvements in Safety Devices for Electric Circuits, of which the following is a specification.

My present invention relates to means whereby an electric circuit which is used to carry a dangerous current or a current which for any reason it is desirable to interrupt, lessen, or otherwise affect may be broken, decreased in conductive capacity, may have substituted therefor another conductor, or may be otherwise changed, thereby preventing the premature or unintentional re-establishment of the current and damage to persons or property, or attaining other useful results.

To these ends my invention consists in the combination, with a conductor to be guarded, of a safety device comprising a second or guard conductor arranged in proximity thereto and conducting and contact devices between said conductors and adapted to complete an electric connection between them upon an undue displacement of one of the said conductors.

My invention further consists in certain parts and combinations thereof hereinafter set forth and claimed.

In order to make my invention more clearly understood, I have shown in the accompanying drawings means for carrying the same into practical effect without, however, limiting the application of the improvement to these constructions, which for the sake of illustration I have delineated.

In said drawings, Figure 1 is a sectional view of a part of a safety device and a diagram of the remainder of the same applied to the guarding of a conductor of an electric railway. Figs. 2 and 3 are respectively a side and plan view of another form of insulating-guide. Fig. 4 is a plan view of another form of insulating-guide and diagram illustrating its application.

Referring to the drawings, A indicates an electric circuit or conductor to be guarded, of which G is the generator or source of electric energy.

In Fig. 1, A represents the trolley-wire or conductor of an electric railway.

B is a guard-circuit connected with the circuit A and having a resistance-coil or other form of resistance R and a generator G'. By the use of suitable connections electric energy for the guard-conductor may be derived from the circuit A and the generator G' dispensed with.

S is an electro-mechanical device—for instance, a magnet M and armature-lever L in the circuit B and adapted to be operated by the current thereof.

$p\ p'$ are contacts in the circuit B, the former of which is carried or operated by the lever L.

S' is a secondary electro-mechanical device—such as a magnet M' and armature-lever L'—in a third or branch circuit $a$. This latter is preferably adapted for a strong current and may be a branch of circuit A, as shown.

P P' are contacts in the circuit A, the former of which is carried or operated by the lever L'. When the parts are in their normal or working position, the amount of current in the circuit B which the resistance R will permit to pass will not be sufficient to lift the weight of the armature-lever L or cause the circuit $a$ to be completed at $p\ p'$. The magnet M' will therefore not be energized, and the weight of the lever L' will maintain the continuity of the circuit A at P P'.

I will now describe that portion of the safety device which effects under certain conditions an electric contact between the conductors A and B irrespective of the resistance R, and which may be used in connection with the arrangement of circuits and electro-mechanical devices above described or in other situations for which it is adapted. C C' is a conductor made in two parts—one electrically attached at $c$ to the guard B and the other similarly connected with the conductor A at $c'$. Said parts are respectively provided with contacts $c^2\ c^3$, which are normally separated, as shown, but which are adapted to touch each other upon the breaking or undue displacement of the guarded conductor. E is a support, case, or insulating-guide adapted to electrically separate the conductors C C' from each other when in their normal position and to maintain them in proper relation to each other. In Fig. 1 said support incloses the contacts $c^2\ c^3$ and is provided with an insulating bottom E'. The latter may be screwed a greater or less distance into the case, and thereby the tension of a supporting-spring $E^2$ regulated. Said spring is interposed between the contact $c^2$ and the bottom $E'$ and has the necessary tension to hold the contacts apart under ordinary conditions. In case of the abnormal displacement of the conductor A or of a portion thereof the tension of the spring $E^2$ will be overcome and electric contacts $c^2$ $c^3$ brought together. The guard-circuit will thereupon be completed through the parts C C' and the resistance R cut out, thereby permitting an increase of the amount of current in the circuit B and around the magnet M. The latter accordingly attracts the lever L, completes circuit $a$, energizes magnet M', and breaks the main circuit at P P'. A contact $p^2$ may be provided and the lever L caused to make contact with it—as, for instance, by the pull of a spring $s$ when the circuit B is broken. The contact $p^2$ being connected with the circuit $a$, this breaking of the circuit B will be accompanied by a breaking of the circuit A at P P'.

In Fig. 2 the support and guide is indicated at $E^3$ and consists of a block or saddle of insulating material resting upon the guard-wire. It is provided with apertures $e$, through which pass the limbs $c^4$ of a conductor or electrical connection $C^3$, the lower end of which is attached to the conductor A. Said support has an opening $e'$, into which the upper end of the conductor $C^3$ will be drawn upon the displacement of the line A, where it will make an electrical contact with the guard B, with the result already described. This support and guide can be employed as a substitute for the device shown at C C' E in Fig. 1. The conductor B in that figure will then pass through the slot $e^2$ of the support $E^3$ between the limbs $c^4$, and the conductor A will be electrically joined to the wire $C^3$, but will be supported in the ordinary manner independently of said wire. When therefore the conductor A breaks or is otherwise unduly displaced, its weight will draw the limbs $c^4$ downward until an electrical contact is effected between the conductors A and B through the conductor $C^3$. The magnet M will then act, as already described, effecting a break or change in the main circuit.

In Fig. 4 is shown an insulating-guide adapted for use with a guard-circuit having two metallic limbs B B arranged in proximity to each other and to the guarded conductor. In this construction the resistance R is interposed between the two limbs of circuit B, as indicated in dotted lines in Fig. 4, and the conductor A is not included in such circuit.

What I claim is—

1. The combination, with a conductor to be guarded, of a second or guard conductor arranged in proximity thereto and constituting a part of an electric circuit, a safety device in said circuit and adapted to effect a change in the guarded circuit, and conducting and electric contact devices between said conductors adapted to complete an electric connection between them upon an undue displacement of one of the said conductors, substantially as set forth.

2. The combination, with a conductor to be guarded, of a second or guard conductor constituting a part of an electric circuit, a safety device in said circuit adapted to effect a change in the guarded circuit, a source of electrical energy for said circuit separate from the generator of the guarded circuit, and normally-open circuit-closing devices between said conductors, substantially as set forth.

3. The combination, with a conductor to be guarded, of a second or guard conductor in an electric circuit and arranged in proximity to the first conductor, a safety device in said circuit, and conducting and electric contact devices between said conductors adapted to complete an electric connection between them upon an undue displacement of one of the said conductors, substantially as set forth.

4. The combination, with a conductor to be guarded, of a second or guard conductor in an electric circuit in which the guarded conductor is included and arranged in proximity to the latter, a safety device in said circuit, and conducting and electric contact devices between said conductors adapted to complete an electric connection between them upon an undue displacement of one of the said conductors, substantially as set forth.

5. The combination, with a guarded conductor and a guarding-conductor, of an electrical connection joined to one of said conductors and extending beyond the other conductor, and an insulating-guide mounted on the latter conductor and engaging said connection, the latter being adapted to engage the conductor beyond which it extends upon undue displacement of one of the conductors, substantially as set forth.

6. The combination, with a conductor and a second conductor acting as a guard therefor, of a circuit-closing conductor connected with the first conductor and extending above and adapted to engage said guard, and an insulating-guide depending from the guard and engaging the circuit-closing conductor, substantially as set forth.

7. The combination, with the conductor A and the guard B, having a connection $C^3$, of an insulating-guide $E^3$, mounted on the guard and engaging said connection, substantially as set forth.

8. The insulating support and guide $E^3$, adapted to be mounted upon a conductor and having slot $e^2$ for engaging the conductor, and apertures $e$, adapted to receive and guide an electrical connection, substantially as set forth.

In testimony whereof I hereunto set my hand in the presence of two witnesses.

MANDEVILLE THUM.

Witnesses:
H. N. Low,
WILLIAM L. ALLEN.